UNITED STATES PATENT OFFICE.

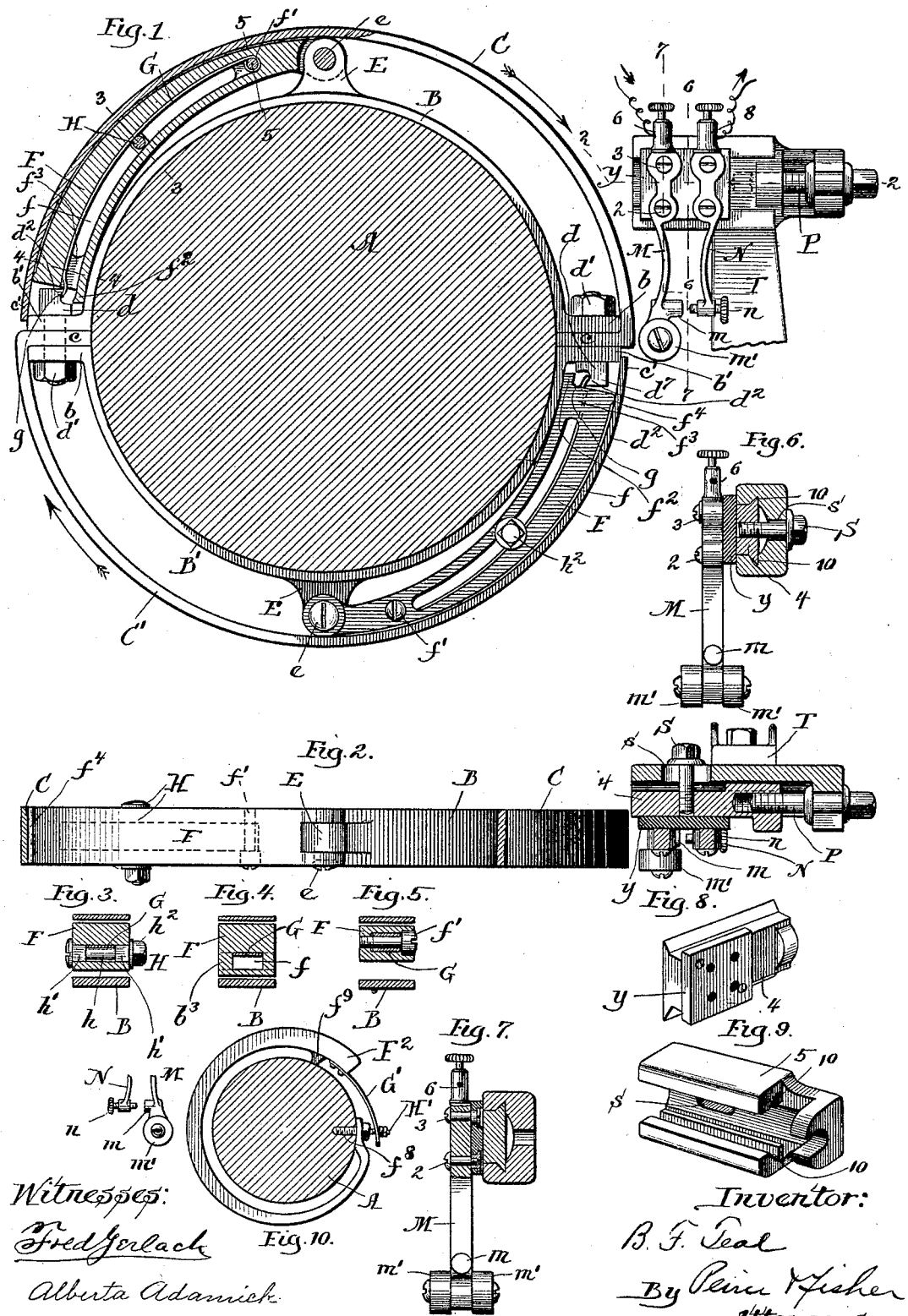

BENJAMIN FRANK TEAL, OF CHICAGO, ILLINOIS, ASSIGNOR TO THE STANDARD VALVE COMPANY, OF SAME PLACE.

SPEED-STOP FOR ENGINES.

SPECIFICATION forming part of Letters Patent No. 528,746, dated November 6, 1894.

Application filed March 9, 1894. Serial No. 503,076. (No model.)

*To all whom it may concern:*

Be it known that I, BENJAMIN FRANKLIN TEAL, a citizen of the United States, residing at Chicago, county of Cook, and State of Illinois, have invented certain new and useful Improvements in Speed-Stops for Engines, of which I do declare the following to be a full, clear, and exact description, reference being had to the accompanying drawings, forming part of this specification.

My present invention has for its object to produce a simple, cheap and effective mechanism whereby when the speed of an engine has reached a predetermined point the throttle valve of the engine will be instantly closed, so that all danger of accidents such as frequently occur from the racing of the engine, in case of failure of the governor to properly control its speed, will be with certainty avoided. This object of invention I have accomplished by the novel construction of apparatus hereinafter described, illustrated in the drawings, and particularly pointed out in the claims at the end of this specification.

Figure 1 is a sectional view through a shaft forming part of or driven by the engine and having my invention applied in connection therewith. Fig. 2 is a view partly in plan and partly in horizontal section on line 2—2 of Fig. 1, a portion of the outer rim being broken away to better illustrate subjacent parts. Figs. 3, 4 and 5 are views taken respectively on lines 3—3, 4—4, and 5—5 of Fig. 1. Fig. 6 is a view in vertical section on line 6—6 of Fig. 1. Fig. 7 is a view in vertical section on line 7—7 of Fig. 1. Fig. 8 is a detail perspective view of the slide that carries the contact arms, and Fig. 9 is a detail perspective view of the rest whereby the slide is sustained. Fig. 10 shows a form of speed stop embodying features of my invention.

A designates the drive shaft of the engine, upon which is held the divided collar formed of plates B and B' that are duplicates of each other, and are provided at their ends with the flanges $b$ and $b'$. Between the flanges $b$ and $b'$ extend the inwardly turned flanges $c$ and $c'$ of the outer semi-circular plates C and C', these flanges $c$ being clamped to the flanges $b$ and $b'$ by the through-bolts D that are preferably formed with the heads $d$ and with threaded ends to receive the nuts $d'$, whereby the several plates are firmly held together and upon the shaft A. On the periphery of each of the inner plates B and B' are formed the lugs E to which are pivotally connected by the bolts $e$, the weighted arms F, these arms being preferably curved as shown. Each of the arms F is formed with the longitudinal slot or groove $f$ and at the inner end of this slot $f$ is fastened as by a screw $f'$ (see Figs. 1 and 5), the plate spring G, the free end $g$ of this spring extending beyond the outer portion of the end of the arm F and into position to engage the hook or shoulder $d^2$ formed on the head $d$ of the corresponding bolt D. Preferably also each of the arms F has the inner portion of its free end formed with an extension or lug $f^2$ to more certainly limit the outward movement of such arm. The slot $f$ of each of the arms F is shown as extending through the free end of such arm but the sides of the slot adjacent the outer ends of the arm are closed by webs $f^3$ in order to give greater strength to such portions of the arm.

It will be seen that while the inner plates B and B' have their ends firmly bolted together, each of the outer plates C and C' has a free end $c'$ and the outer plates C and C' will be formed of brass or other metal having sufficient elasticity to permit these plates to oppose the centrifugal force of the weighted arms F and F'. Through the slot $f$ of each of the weighted arms extends an adjusting bolt H that is preferably formed with the rounded portion $h$ whereon will rest the spring plate G and the flattened portions $h'$ (see Fig. 3) that will bear against the walls of the slot $f$, and the threaded end of this bolt is provided with a nut $h^2$ whereby the bolt may be set at any desired point along the slot $f$. It will be readily seen that by adjusting the bolt forward or backward along the slot $f$ the force of the spring plate G can be varied as desired in order to determine at what point the weighted arms F shall be thrown outward a sufficient distance to effect the stoppage of the engine in manner to be presently defined. Thus for example, when the adjusting bolts H are adjacent the pivoted ends of the springs G these springs will yield readily to the centrifugal force acting upon the arms F thereby permitting the arms to be readily thrown outward, but if the bolts H be moved toward the free ends of the arms F the force of the spring will be increased and the outward movement of the arms will be correspondingly resisted. Preferably each of the arms F is furnished adjacent its free end with a small lug or rim $f^4$ that will bear upon the inner face of the outer rim C adjacent its free end.

In practice the adjusting bolts H will be set at such point along the slots $f$ of the weighted arms F that under ordinary speed of the engine these arms will not be thrown out to any considerable extent, or at least not far enough to effect the shifting of the means, (to be presently described,) whereby the closing of the throttle valve will be effected. When, however, the speed of the engine, from any cause, as for example a failure of the governor to properly do its work, becomes excessive, the free ends of the weighted arms F will, by reason of the centrifugal force due to the excessive speed, thrust the free end $c'$ of the plates C and C' in outward direction to such extent as to cause the ends of the plates to operate the mechanism whereby the closing of the throttle valve will be effected.

In order to utilize the outward movement of the weighted arms F for the purpose of checking the speed of the engine, I prefer to place adjacent the path of these arms an electric circuit controller adapted to be operated when the weighted arms are thrust outward so as to cause the electric current to effect the movement of such parts as are necessary to accomplish the closing of the throttle valve.

In the preferred form of my invention the circuit controller comprises a movable (preferably flexible) arm M carrying a contact point $m$ and carrying at its free end preferably a friction roller $m'$. The inner end of this arm M is held by screws 2 and 3 on the insulating plate Y of the slide 4 that is adjustably mounted within the slide rest 5 and to the end of the arm M is connected a binding-post 6 to which will be attached one of the wires of an electric circuit. To the insulating plate Y is also attached a contact arm N to one end of which is connected a binding-post 8 that will have attached thereto one of the wires of the electric circuit, and the opposite end of the arm N is preferably provided with an adjustable contact screw $n$ that extends normally a slight distance from the contact point $m$ of the arm M. The slide 4 is held within the dove-tailed grooves 10 of the slide support 5 and this slide 4 is adjustable back and forth by means of a collar screw P, the threaded end of which extends within a threaded hole formed in the end of the slide 4. Preferably also the slide support 5 is formed with a slot $s$ through which will pass a binding-screw S that enters a threaded hole in the slide 4 and enables this slide to be more firmly fixed in position. The slide support 5 will be held in position by a bracket T or by any other convenient means.

From the foregoing description the operation of the form of my invention above set forth will be seen to be as follows: The slide 4 will be adjusted so as to bring the friction roller $m'$ carried by the flexible arm M at proper distance from the outer face of the plates C and C', as seen in Fig. 1 and the set-screw $n$ of the arm N will be properly adjusted. Under the normal speed of the engine, the plates C and C' will not have their free ends thrust outward by the weighted arms F a sufficient distance to contact with the friction rollers $m'$. If, however, the engine should "run away" the centrifugal force due to the increased speed would cause the weighted arms F to thrust outward the free ends $c'$ of the plates C and C', thereby bringing such plates into contact with the friction roller $m'$ and forcing the flexible arm M to contact, at its point $m$ with the screw $n$ of the contact arm N. It will be understood that the electric circuit will be normally broken so long as the contact arms M and N are in their normal position, but when the contact point $m$ is thus forced against the contact screw $n$ the electric circuit will be closed and this closing of the electric circuit will cause the operation of suitable mechanism whereby the stopping of the engine will be effected. I have not deemed it necessary to illustrate the construction of mechanism that will be brought into operation by this closing of the electric circuit, as such mechanism forms no part of my present invention; but one simple form of such mechanism is shown in Letters Patent granted to the Standard Valve Company as my assignee, January 30, A. D. 1894. It is manifest, however, that the closing of the electric circuit could be utilized in connection with any suitable form of mechanism other than that above mentioned.

It is obvious that the details of construction above set out may be varied within wide limits without departing from the spirit of my invention. Thus for example, while I prefer to employ two weighted arms F and prefer also to employ the outer plates C and C', still one weighted arm might be used to effect the operation of the circuit controller and the plates C and C' might be dispensed with, thus allowing the weighted arms F to directly contact with the friction roller $m'$ of the circuit controller.

In Fig. 10 of the drawings I have illustrated a form of speed stop embodying the broad idea of my invention. In this form of the invention the drive shaft A has mounted thereon a weighted arm formed of the flexible curved bar $F^2$ that extends around the shaft A, this bar $F^2$ being attached to the shaft A in any convenient manner, as for example by the screw $f^3$. The free end of the weighted arm $F^2$ is heavier and consequently less flexible than the end of the arm which is attached to the shaft A and upon the inner side of this arm $F^2$ may be attached a lug $f^9$ that serves to hold the arm $F^2$ in proper position with respect to the shaft A. To the end of the movable weighted arm $F^2$ is attached a plate spring $G'$ through the free end of which passes an adjusting screw $H'$ that is furnished with nuts whereby the force of the spring $G'$ can be adjusted. The inner end of the screw $H'$ is tapped into the shaft A. Adjacent the shaft A will be mounted the contact arms M and N of the electric circuit controller which may be the same construction as that illustrated in Fig. 1 of the drawings. With this form of the invention it will be seen that when the speed of the shaft A becomes excessive, the movable weighted arm $F^2$ will be thrown outward and will contact with the roller $m'$ on the contact arm M thereby causing the contact point $m$ of this arm to engage the contact screw $n$ of the contact arm N in order to close the electric circuit through said arms. The slot in the end of the spring $G'$ permits the outward movement of the weighted arm $F^2$ under the centrifugal force and the screw-bolt $H'$ determines the resistance offered by the spring $G'$ to such outward movement of the arm $F^2$.

It will be seen that in the several forms of my invention above described the speed stop being mounted upon the drive shaft of the engine, this stop will be operated with certainty whenever the speed of the engine becomes excessive. By thus locating the speed stop upon the drive shaft of the engine, as I prefer to do, the speed of the engine can be checked with certainty and consequently there is no danger of a failure of the stop to respond by reason of any defect or breakage of the governor or of any of the intermediate parts between the drive shaft of the engine and the governor.

Having thus described my invention, what I claim as new, and desire to secure by Letters Patent, is—

1. A speed stop for engines, comprising a pivoted arm, a spring for resisting the outward movement of said arm, said spring projecting beyond the end of said arm, a stop with which the end of said spring engages and an electric circuit controller arranged to be operated by the outward movement of said arm, substantially as described.

2. A speed stop for engines, comprising a pivoted arm having a slot formed lengthwise therein, a plate spring located in said slot and having its end projecting therefrom, a stop to engage the projecting end of said spring and an electric circuit controller arranged to be operated by the outward movement of said arm, substantially as described.

3. A speed stop for engines, comprising a pivoted arm, a plate spring carried by said arm, a shifting bolt carried by said arm for adjusting the force of said plate spring, a stop with which said spring will engage to resist the outward movement of said arm and an electric circuit controller arranged to be operated by the outward movement of said arm, substantially as described.

4. A speed stop for engines, comprising a pivoted arm F having a projecting end $f^2$, and having a slot $f$, a plate spring G located within said slot and having an end projecting therefrom, an adjusting bolt H movable within said slot $f$ and a stop or shoulder $d^2$ for limiting the outward movement of said arm F and means for controlling a valve arranged in the path of the pivoted arm and with which said arm engages, substantially as described.

5. A speed stop for engines, comprising the combination of the inner and outer plates B and $B'$ and C and $C'$, the intermediate pivoted arms F, suitable springs for resisting the outward movement of said pivoted arms and means for adjusting the force of said spring and means for controlling a valve arranged in the path of the pivoted arms and with which said arms engage, substantially as described.

6. A speed stop for engines, comprising an inner collar, an outer rim comprising a plate C having a free end $c'$ and an intermediate movable arm F and means for controlling a valve arranged in the path of the movable arm and with which said arm engages, substantially as described.

7. A speed stop for engines, comprising the inner and outer plates B and $B'$ and C and $C'$ having flanges whereby said plates are bolted together, and said plates C and $C'$ having free ends $c'$, the weighted arms F pivotally sustained intermediate said plates B and $B'$ and C and $C'$, said weighted arms being provided with slots $f$, springs G within said slots $f$ and projecting beyond the ends thereof and bolts D with which the ends of said springs engage and means for controlling a valve arranged in the path of the weighted arms and with which said arms engage, substantially as described.

8. A speed stop for engines, comprising the combination of a pivoted arm, a spring for resisting the outward movement of said arm, an electric circuit controller comprising a contact arm having a part extending into position to be shifted by the outward movement of said pivoted arm and an adjustable support for said contact arm, substantially as described.

9. The combination with the main drive shaft of an engine, of a centrifugally movable body mounted upon said shaft and an electric circuit controller located adjacent the path of said movable body and within reach thereof when said body has shifted from its normal position, said circuit controller having contact points, the passage of current between which is controlled by said movable body when shifted beyond its normal position, substantially as described.

B. FRANK TEAL.

Witnesses:
FRED GERLACH,
ALBERTA ADAMICK.